(12) United States Patent
Lin

(10) Patent No.: US 8,365,716 B2
(45) Date of Patent: Feb. 5, 2013

(54) BARBECUE GRILL ASSEMBLY

(76) Inventor: Chun-Cheng Lin, Taichung (TW)

(*) Notice: Subject to any disclaimer, the term of this patent is extended or adjusted under 35 U.S.C. 154(b) by 338 days.

(21) Appl. No.: 12/711,245

(22) Filed: Feb. 23, 2010

(65) Prior Publication Data

US 2011/0203566 A1   Aug. 25, 2011

(51) Int. Cl.
*F24L 3/00* (2006.01)
*A47J 37/00* (2006.01)

(52) U.S. Cl. ..... 126/1 R; 126/25 R; 126/9 B; 126/41 R; 126/37 A; 108/64; 108/44

(58) Field of Classification Search .................. 126/1 R, 126/41 R, 9 B, 25 R, 37 A; 108/44, 46, 125 X; 280/651, 652
See application file for complete search history.

(56) References Cited

U.S. PATENT DOCUMENTS

| | | | | | |
|---|---|---|---|---|---|
| 2,339,811 | A | * | 1/1944 | Roth | 62/142 |
| 2,471,730 | A | * | 5/1949 | Doerr | 108/33 |
| 2,833,608 | A | * | 5/1958 | Tobias | 108/44 |
| 3,386,430 | A | * | 6/1968 | Linstead | 126/25 A |
| 3,407,802 | A | * | 10/1968 | Warner | 126/25 R |
| 4,494,465 | A | * | 1/1985 | Fick, Jr. | 108/44 |
| 4,665,888 | A | * | 5/1987 | Christen et al. | 126/25 R |
| 4,741,322 | A | * | 5/1988 | Lin | 126/25 R |
| 4,887,526 | A | * | 12/1989 | Blatt | 108/44 |
| 4,995,322 | A | * | 2/1991 | Frederick | 108/44 |
| 5,090,398 | A | * | 2/1992 | Raymer et al. | 126/41 R |
| 5,558,008 | A | * | 9/1996 | Jenkins | 99/340 |
| 5,730,066 | A | * | 3/1998 | Auten et al. | 108/44 |

* cited by examiner

*Primary Examiner* — Steven B McAllister
*Assistant Examiner* — Nikhil Mashruwala

(57) ABSTRACT

A barbecue grill assembly is provided. The barbecue grill assembly comprises a barbecue unit, at least one pedestal, at least one bolt and a plate construction. The pedestal supports said barbecue unit and includes at least one hole. The bolt is disposed corresponding to said hole, and includes at least one body fitted to said hole so as to fasten said bolt. The plate construction includes four leg units pivotally disposed on one face of said plate construction and at least one slot disposed on the side of said plate construction. Wherein said slot is corresponding to said bolt and might be separate from or linked up with said body, so that said plate construction is combinable or detachable to said pedestal. Said leg unit might be received when rotated parallel to said plate construction; said leg unit might be unfolded when rotated perpendicular to said plate construction.

5 Claims, 6 Drawing Sheets

BARBECUE GRILL ASSEMBLY

FIELD OF THE INVENTION

The present invention relates to a barbecue grill assembly, particularly to a barbecue grill assembly which combines the function of barbecue grill and dining table.

DESCRIPTION OF THE PRIOR ART

In the modern time, there are more and more competitions existed in our society. Nowadays, in order to live, strive for life and feed one's family, everyone needs to work, including man and woman. Therefore, the pressure everyone has endured had become more and more severe. In this reason, people may like to have some barbecue to relieve their stress, and dining, entertainment or several gossips might also be favorable as well.

Conventionally, the barbecue grill assembly is a essential equipment for those activity, as well as the coal, tinder, snack, dessert, drink or sauce are definitely required which can make the barbecue perfect. Besides the barbecue grill assembly, the dining table serving as placement for those miscellaneous objects is absolutely needed. However, the barbecue grill assembly and the dinning table are bulky and not convenient to be moved.

Therefore, how to combine those two large bulks, improving the convenience of outdoor barbecue, has become a critical issue needed to be resolved.

SUMMARY OF THE INVENTION

The primary object of present invention is to combine the bulky barbecue grill assembly and dining table, so as to reduce the space occupation and improve the convenience of outdoor barbecue.

To achieve the foregoing and other objects, a barbecue grill assembly is provided. The barbecue grill assembly comprises a barbecue unit, at least one pedestal, at least one bolt and a table comprising a plate construction. The pedestal supports said barbecue unit and includes at least one hole. The bolt is disposed corresponding to said hole and includes at least one body fitted to said hole so as to fasten said bolt. The plate construction includes four leg units pivotally disposed on one face of said plate construction and at least one slot disposed on the side of said plate construction. Wherein said slot is corresponding to said bolt and might be separate from or linked up with said body, so that said plate construction is combinable or separable to said pedestal. Said leg unit might be received when rotated parallel to said plate construction; said leg unit might be unfolded when rotated perpendicular to said plate construction.

In the aforementioned barbecue grill assembly, wherein said bolt further includes a head connecting to said body, so that said body and said hole is fitted by means of the threads.

In the aforementioned barbecue grill assembly, wherein said body is a column, the diameter of said body is small than width of said slot so that said body might be linked up with said slot by disposing across said slot.

In the aforementioned barbecue grill assembly, wherein said barbecue grill assembly further includes a first handle and said plate construction further includes a second handle, said first handle is disposed at the side of said barbecue grill assembly, said second handle might be fastened and jammed by said first handle.

In the aforementioned barbecue grill assembly, wherein said leg unit includes a first leg and a second leg, one end of said first leg is pivotally disposed on said plate construction, another end of said first leg is pivotally connected to said second leg.

In the aforementioned barbecue grill assembly, wherein said leg unit includes a first leg and a second leg, one end of said first leg is pivotally disposed on said plate construction, said second leg is overlapping disposed in said first leg and might be stretched out from or received in said first leg by slipping.

In the aforementioned barbecue grill assembly, wherein said plate construction includes a first plate and a second plate, said first plate contains a first slide rail, said second plate contains a second slide rail, said first slide rail is matched and slipped corresponding to said second slide rail so that said second plate might be slipped corresponding to said first plate.

In the aforementioned barbecue grill assembly, wherein said plate construction includes a first plate, a second plate and at least one pivot, said first plate is connected to said second plate by means of said pivot and might be rotated against said pivot. Said plate construction further includes a latch and at least one first ring firmly disposed on said first plate, said latch might penetrate said first ring so as to be repeatedly movable by one end of said latch and resist said second plate so as to prevent said second plate from rotating against said first plate by another end of said latch. Said plate construction further includes at least one second ring firmly disposed on said second plate, said second ring is corresponding to said latch, said latch might be repeatedly penetrate or leave said second ring.

Whereby, the barbecue grill assembly of present invention might be combined or disassembled. When moved to outdoors, the leg unit of the plate construction might be received, as well as combining the plate construction with the pedestal, and then the barbecue grill assembly might be conveniently moved and taken along. It might save the space. When barbecued, the plate construction might be disassembled, as well as unfolding the leg unit, and then the plate construction might be served as dining table and the leg unit might be served as table base. In this manner, it might increase the area of the table for placement of food or cooker. Therefore, the barbecue grill assembly might have the function of barbecue and dining table, and then combines or disassembles the dining table.

The foregoing, as well as additional objects, features and advantages of the invention will be more readily apparent from the following detailed description, which proceeds with reference to the accompanying drawings.

DESCRIPTION OF THE PREFERRED EMBODIMENTS

To exemplify the technical features of present invention, an appliance of the present invention is introduced and then the benefit will be understood.

1st Embodiment

Figure 1A:
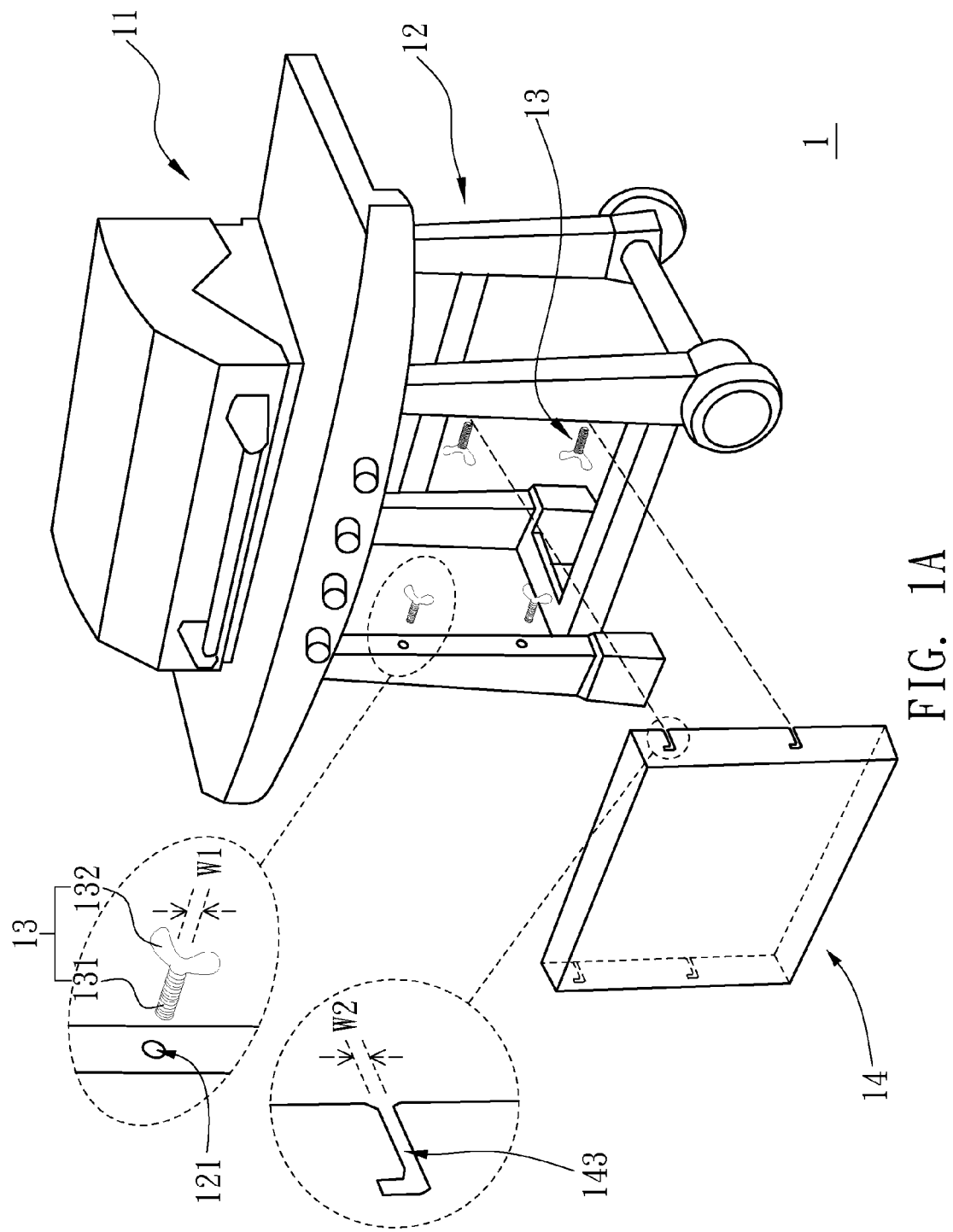
FIG. 1A is the first installing diagram of the barbecue grill assembly of the 1st embodiment in present invention.

Please refer to FIG. 1A, FIG. 1A is the first installing diagram of the barbecue grill assembly of the 1st embodiment in present invention. As shown in FIG. 1A, a barbecue grill assembly 1 includes a barbecue unit 11, a pedestal 12, four bolts 13 and a plate construction 14. Wherein the barbecue unit 11 may cook food or have some outdoor barbecue. The pedestal 12 is disposed beneath the barbecue unit 11 and supports the barbecue unit 11. The pedestal 12 includes four holes 121 and each of the hole 121 is disposed corresponding to a bolt 13. The bolt 13 contains a body 131 and a head 132. The body 131 has threads on it which connects to the head 132. The bolt 13 might be fitted to the hole 121 by fastening the body 131 into the hole 121 by taking advantage of the threads; in this manner, the bolts 13 might be matched with and fixed on the holes 121. Moreover, the bolts 13 might be tightened or released by rotating the heads 132. Besides, the plate construction 14 includes four L-shaped slots 143; each slot 143 is disposed at side of the plate construction 14 and corresponding to the bolt 13. When installing the plate construction 14, it is needed to align the opening of the four L-shaped slots 143 with the bodies 131 of the bolts 13 and move the bodies 131 to reach bottom of the slots 143 along with the L-shaped path, and then the plate construction 14 might be combined and fixed on the pedestal 12. When disassembling the plate construction 14, it is needed to grasp at the plate construction 14 by user's hand and separate the slots 143 from the bodies 131 along with L-shaped path, and then the plate construction 14 might be easily and conveniently disassembled. In this manner, the plate construction 14 and pedestal 12 might be installed or disassembled by means of fitting or separating the bodies 131 and the slots 143.

Figure 1B:
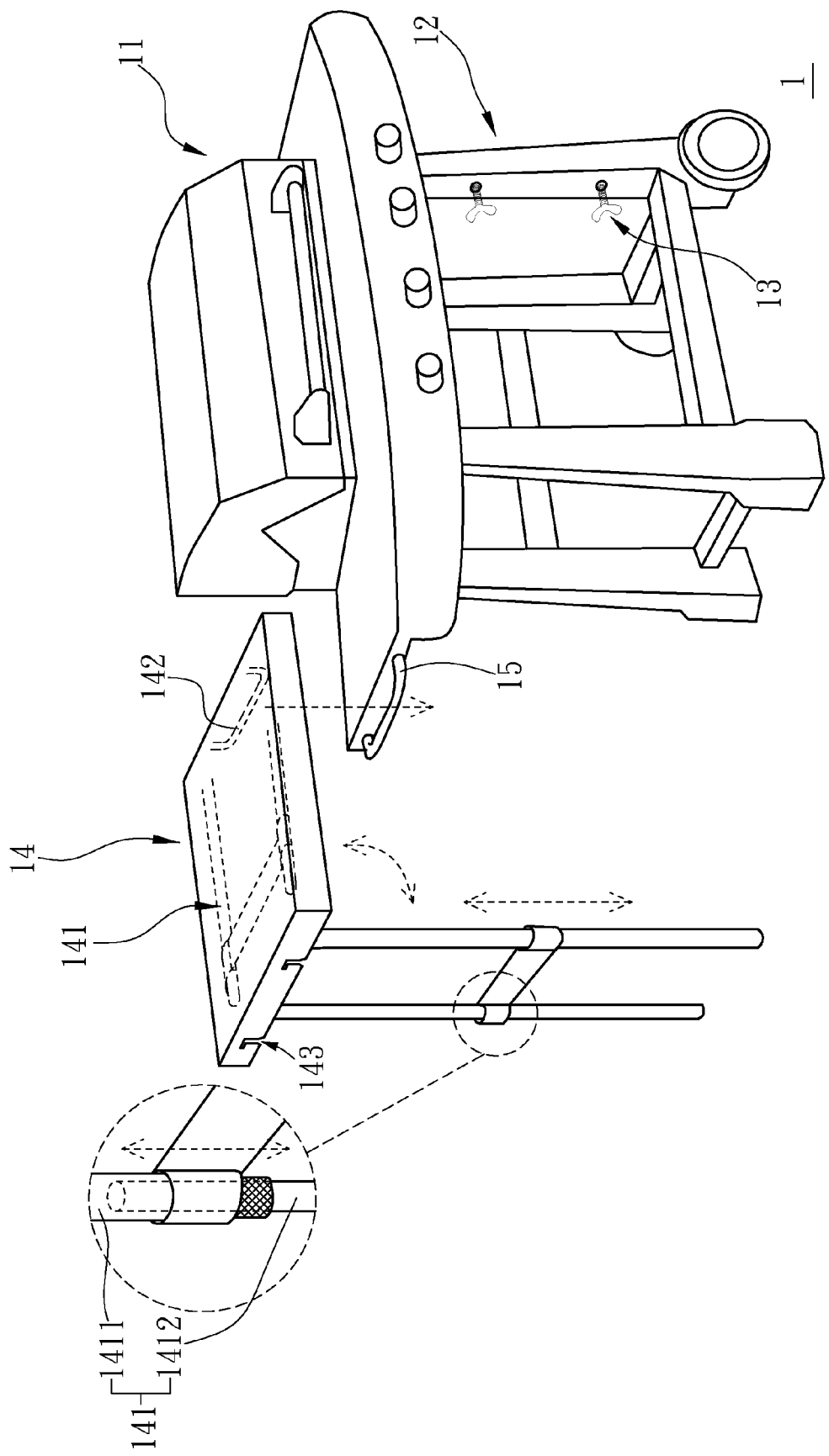
FIG. 1B is the second installing diagram of the barbecue grill assembly of the 1st embodiment in present invention.

Next, please refer to FIG. 1B, FIG. 1B is the second installing diagram of the barbecue grill assembly of the 1st embodiment in present invention. As shown in FIG. 1B, the barbecue grill assembly 1 further includes a first handle 15 disposed at side of the barbecue grill assembly 1. The plate construction 14 further includes a second handle 142 and four leg unit 141. The second handle 142 might be fastened and jammed by the first handle 15. The leg unit 141 is pivotally disposed under the plate construction 14 so as to rotate around the contact area of the plate construction 14 and the leg unit 141. When rotating the leg unit 141 and making it parallel to the plate construction 14, the leg unit 141 might be received. When rotating the leg unit 141 and making it perpendicular to the plate construction 14, the leg unit 141 might be unfolded. Besides, as shown in the enlarged diagram of FIG. 1B, each leg unit 141 includes a first leg 1411 and a second leg 1412. One end of the first leg 1411 is pivotally disposed on the plate construction 14; the second leg 1412 is overlapping disposed in the first leg 1411 and might be stretched out from or received in the first leg 1411 by slipping. As shown in FIG. 1B, at right side of the plate construction 14, the second handle 142 might be fastened and jammed by the first handle 15 of the barbecue grill assembly 1. At left side of the plate construction 14, the plate construction 14 might be supported by the leg unit 141, then, adjusting the extending length of the second leg 1412, making the total length of the first leg 1411 and the second leg 1412 be equivalent to the altitude of the first handle 15, as a result the plate construction 14 might be horizontally disposed at side of the barbecue grill assembly 1. In this manner, the plate construction 14 might be treated as dining table to place food, cooker, sauce or dishes. It's definitely convenient to barbecue.

Additionally, the reason why plate construction 14 and bolt 13 might be fastened is: the body 131 might be a cylinder and the diameter W1 of the body 131 is small than the width W2 of the slot 143. Thus, the body 131 might be disposed penetrating the slot 143 and then the body 131 might be linked up with the slot 143 by disposing across the slot 143. Besides, the diameter W1 or the width W2 might be modulate to make them close fit, i.e. the diameter W1 being slightly small than width W2, so that the plate construction 14 and the pedestal 12 as a result might be firmly fixed without wavering and falling off. Moreover, in the other embodiment, the body 131 might be designed as square column, pentagonal column or hexagonal column; correspondingly, the hole 121 might be designed as quadrilateral, pentagon or hexagon. In these circumstances, the aforementioned benefits can also be achieved if the body 131 is disposed across the hole 121 by close fitting.

2nd Embodiment

Figure 2:
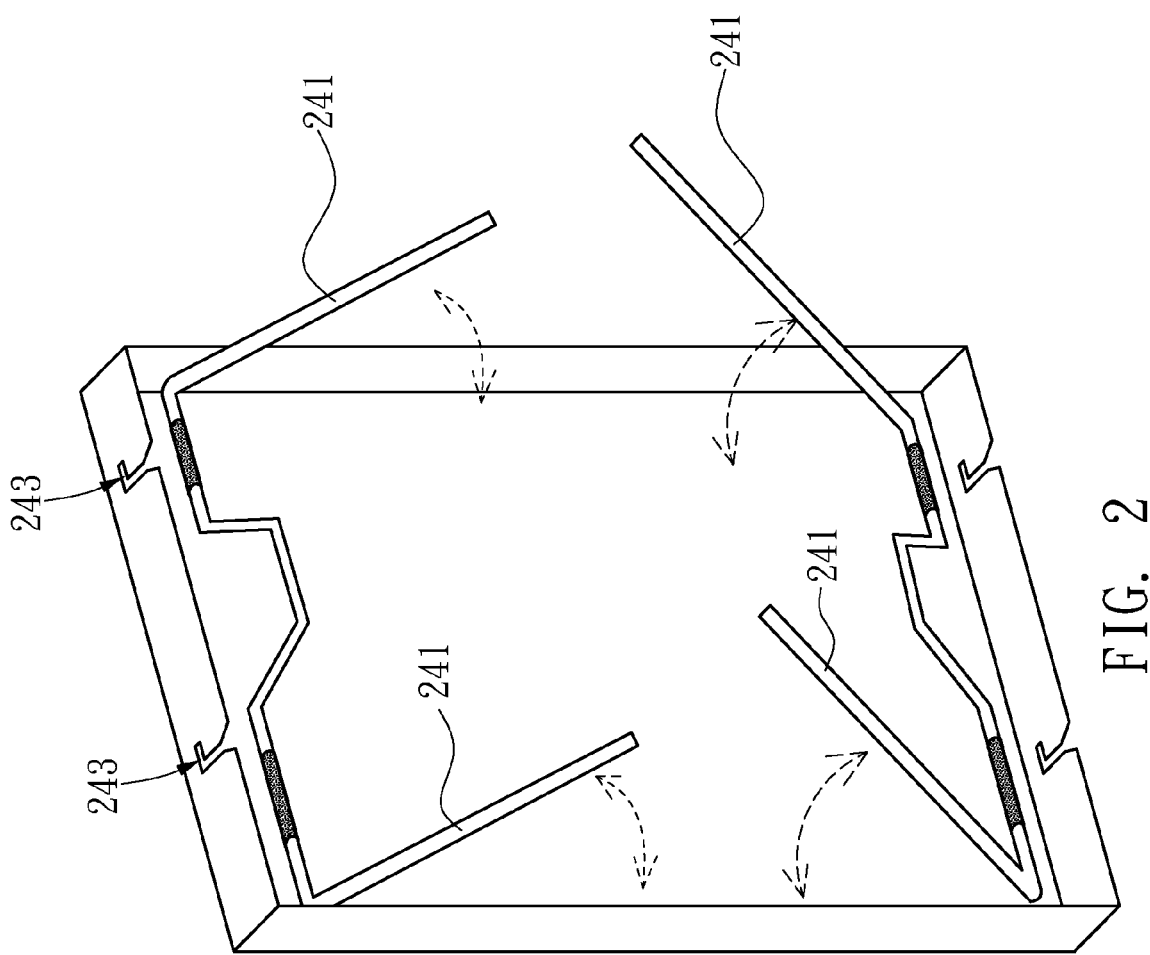
FIG. 2 is the diagram of the plate construction of the 2nd embodiment in present invention.

Please refer to FIG. 2, FIG. 2 is the diagram of the plate construction of the 2nd embodiment in present invention. As shown in FIG. 2, the plate construction 24 includes four L-shaped slots 243 and four leg units 241. The leg units 241 are pivotally disposed at one face of the plate construction 24 so that the leg units 241 might be rotated around the contact area of the plate construction 24 and the leg units 241. In this embodiment, upper two leg units 241 are one-body shaped and might be rotated together; so are the lower two. When four leg units 241 of the plate construction 24 are unfolded, the leg units 241 might be perpendicular to the plate construction 24 and then the plate construction 24 might be served as dining table, four leg units 241 might be served as table bases. In this manner, it would be extremely convenient for outdoor barbecue and placement of food, cooker, sauce or dishes. When the barbecue is finished, four leg units 241 might be rotated and received at side of the plate construction 24. Then, the plate construction 24 might be combined with the pedestal 12 (as shown in FIG. 1A) when four slots 243 of the plate construction 24 are aligned and linked up with the bolts 13 (as shown in FIG. 1A).

3rd Embodiment

Figure 3:
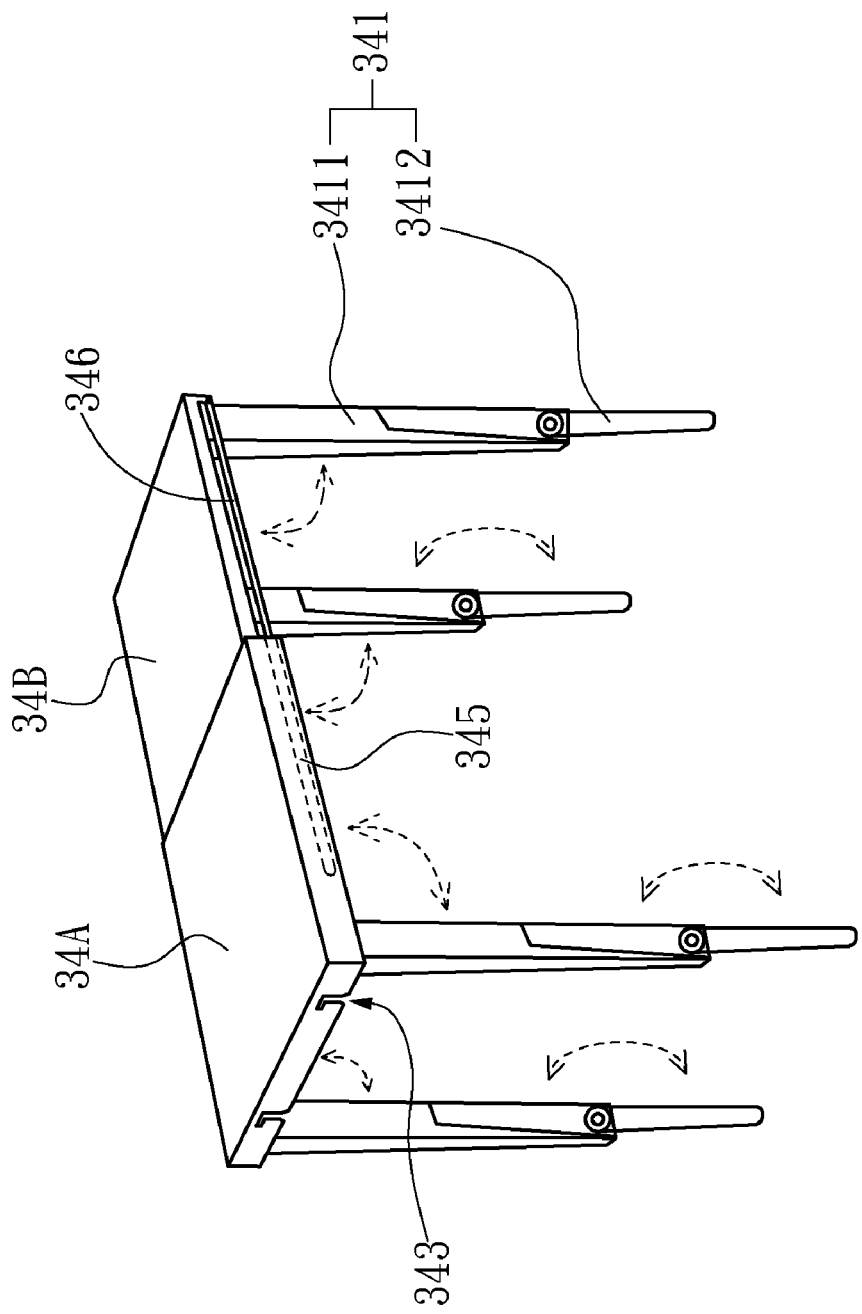
FIG. 3 is the diagram of the plate construction of the 3rd embodiment in present invention.

Please refer to FIG. 3, FIG. 3 is the diagram of the plate construction of the 3rd embodiment in present invention. As shown in FIG. 3, the plate construction 34 includes four slots 343 (only two are depicted) and four leg units 341. Each of the leg units 341 includes a first leg 3411 and a second leg 3412. Upper end of the first leg 3411 is pivotally disposed beneath the plate construction 34 and lower end of the first leg 3411 is pivotally connected to the second leg 3412. Thus the second leg 3412 might be fixed or rotated against the lower end of the first leg 3411. In this manner, the first legs 3411 and the second leg 3412 might be received at lower side of the plate construction 34. Besides, the plate construction 34 further includes a first plate 34A and a second plate 34B. The first plate 34A contains a first slide rail 345 and the second plate 34B contains a second slide rail 346, so that the first plate 34A and the second plate 34B might be coupled and relatively slipped against each other by matching first slide rail 345 and the second slide rail 346. In preferable case, the second plate 34B might be slipped and then received beneath the first plate 34A. In this manner, the plate construction 34 might adjust the area of the dining table according demand.

4th Embodiment

Figure 4A:
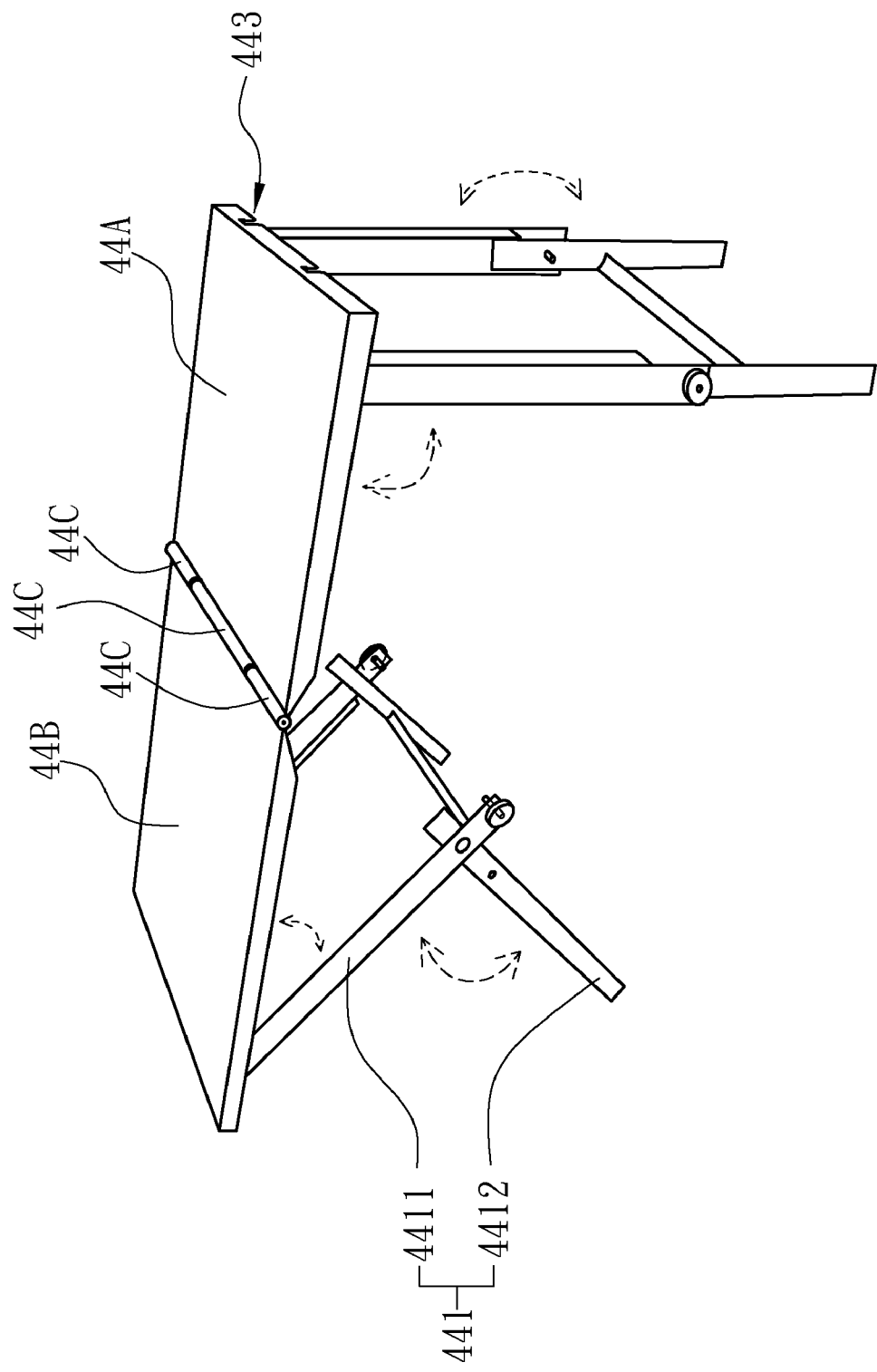
FIG. 4A is the diagram of the plate construction of the 4th embodiment in present invention.

Please refer to FIG. 4A, FIG. 4A is the diagram of the plate construction of the 4th embodiment in present invention. As shown in FIG. 4A, the plate construction 44 includes four leg units 441 and four slots 443 (only two are depicted). Each of the leg units 441 includes a first leg 4411 and a second leg 4412. Upper end of the first leg 4411 is pivotally disposed at beneath of the plate construction 44 and lower end of the first leg 4411 is pivotally connected to the second leg 4412. As shown in FIG. 4A, left two leg units 441 might be received by clockwise rotation of the second legs 4412 and counterclockwise rotation of the first legs 4411. Then, the leg unit 441 might be received beneath the plate construction 44. Moreover, the plate construction 44 further includes a first plate 44A, a second plate 44B and three pivots 44C. The first plate 44A is connected to the second plate 44B by means of the pivot 44C and might be rotated against the pivot 44C.

Figure 4B:
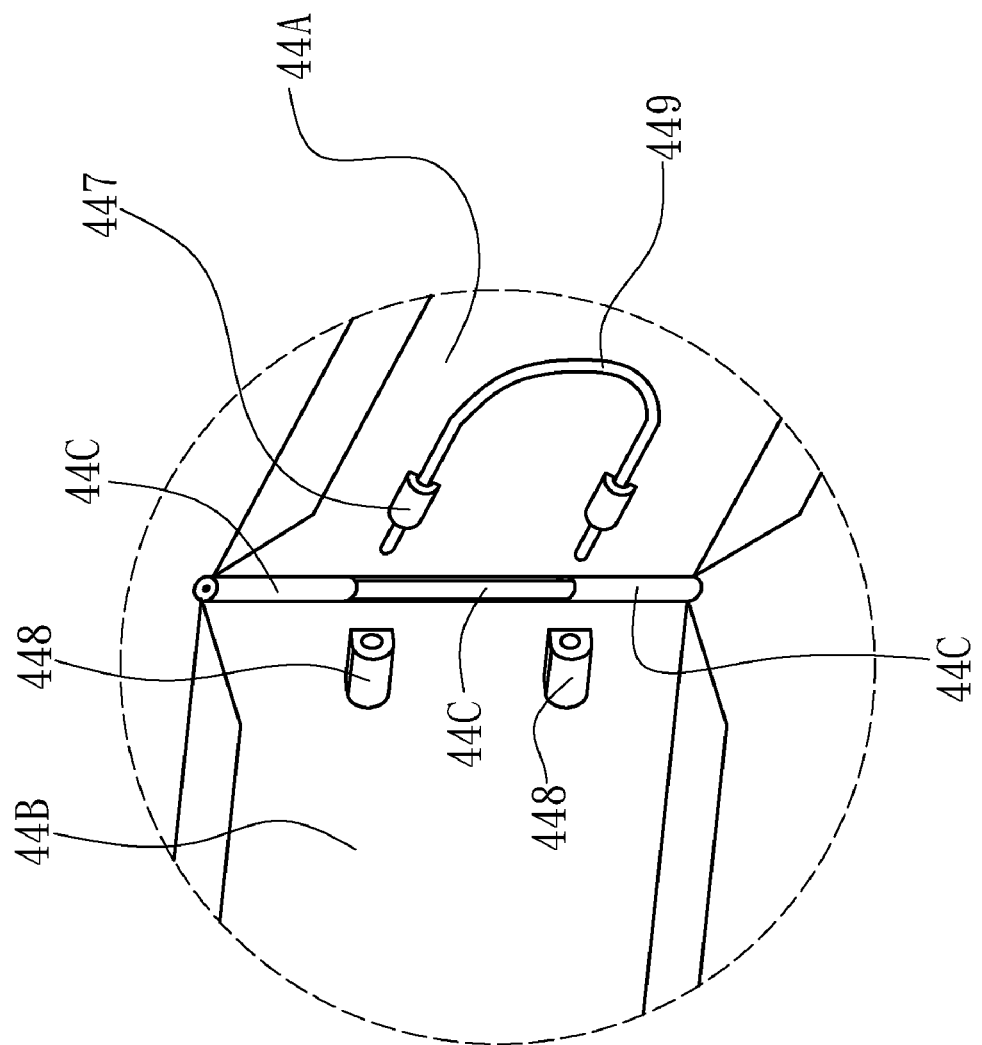
FIG. 4B is the connected diagram of the first plate and the second plate of the 4th embodiment in present invention.

Next, please refer to FIG. 4B, FIG. 4B is the connected diagram of the first plate and the second plate of the 4th embodiment in present invention. As shown in FIG. 4B, the plate construction 44 further includes a latch 449, two first rings 447 and two second rings 448 beneath. The first rings 447 are firmly disposed under the first plate 44A. The latch 449 penetrates the first rings 447 so as to be repeatedly movable. The first rings 447 might bind the latch 449 to the lower face of the first plate 44A. The second rings 448 are firmly disposed at beneath of the second plate 44B and relatively corresponding to left end of the latch 449. Thus the latch 449 might be repeatedly penetrated or separated from the second rings 448. In this manner, right end of the latch 449 might be movable by means of the first rings 447; left end of the latch 449 might penetrate the second rings 448, resist the second plate 44B, prevent the second plate 44B from rotating against the first plate 44A, and then make the first plate 44A and the second plate 44B become plane-shaped without bending. As shown in FIG. 4B, when the latch 449 separates from the second rings 448, the first plate 44A and the second plate 44B as a result could be rotated around the pivots 44C. In this case as shown in FIG. 4B, the latch 449 is U-shaped. However, in other circumstance, the latch 449 could be a column which may penetrate one first ring 447 and one second ring 448 to prevent rotation of the first plate 44A and the second plate 44B. Besides, only one pivot 44C could be disposed instead of three pivots 44C shown in FIG. 4B.

Summarily, the barbecue grill assembly of present invention might be combined or disassembled. When the barbecue grill assembly is moved to outdoors, the leg unit of the plate construction could be received and the plate construction could be combined with the pedestal. Thus the barbecue grill assembly might be conveniently moved and taken along. It might save the space. When barbecues, the plate construction could be disassembled and the leg unit could be unfolded. Thus the plate construction could be served as dining table and the leg unit could be served as table base. In this manner, it might increase the area of the table for placement of food or cooker. Therefore, the barbecue grill assembly might have the function of barbecue and dining table, and then conveniently combines or disassembles the dining table.

While certain exemplary embodiments have been described and shown in the accompanying drawings, it is to be understood that such embodiments are merely illustrative of and not restrictive on the broad invention, and that this invention is not be limited to the specific constructions and arrangements shown and described, since various other modifications may occur to those ordinarily skilled in the art.

What is claimed is:

1. A barbecue grill assembly, comprising:
a barbecue unit;
a plurality of barbeque support legs supporting said barbecue unit and including at least one hole;
at least one bolt disposed corresponding to said hole and including at least one body fitted to said hole so as to fasten said bolt;
a first handle coupled to a side of the barbecue unit;
a table including four table leg units pivotally disposed on one face of said table, a second handle, and at least one slot disposed on a side of said table;
wherein, said at least one slot corresponds to said at least one bolt and is capable of being separated from and linked up with said body, so that said table is attachable to said plurality of barbeque support legs in a stowed position in which the one face of the table is substantially vertical, said table leg units capable of being received within said table when rotated parallel to said table, said table leg units capable of being unfolded when rotated perpendicular to said table, and wherein said second handle is configured to fastenably engage with said first handle so as to link the table to the barbeque grill, the face of the table being in a horizontal orientation.

2. The barbecue grill assembly of claim 1, wherein said bolt further includes a head connecting to said body, so that said body and said hole is fitted by means of the threads.

3. The barbecue grill assembly of claim 1, wherein said body is a column, a diameter of said body is smaller than a width of said slot so that said body is capable of being linked up with said slot by disposing across said slot.

4. The barbecue grill assembly of claim 1, wherein said second handle and said first handle are configured to engage substantially orthogonally with each other.

5. The barbecue grill assembly of claim 1, wherein said table leg unit includes a first leg and a second leg, one end of said first leg is pivotally disposed on said table, said second leg is overlapped with said first leg and capable of being stretched out from or received in said first leg by a sliding engagement.

* * * * *